United States Patent [19]

Hsu

[11] Patent Number: 4,942,964
[45] Date of Patent: Jul. 24, 1990

[54] STORING BOX FOR BOOSTER CABLE

[75] Inventor: Pi-Chen Hsu, Taipei, Taiwan

[73] Assignee: Shirley S. Lan, Millburn, N.J.

[21] Appl. No.: 234,549

[22] Filed: Aug. 22, 1988

[51] Int. Cl.⁵ .............................................. B65D 73/02
[52] U.S. Cl. .................................... 206/334; 206/389; 206/825
[58] Field of Search .................. 220/20; 206/335, 334, 206/389, 825

[56] References Cited

U.S. PATENT DOCUMENTS

| | | | |
|---|---|---|---|
| 2,715,457 | 8/1955 | Voegeli | 206/389 |
| 3,082,868 | 3/1963 | Hubbard | 206/389 |
| 3,520,988 | 7/1970 | Ballock, Sr. | 206/389 |
| 3,693,906 | 9/1972 | Robinson | 206/389 |
| 4,298,122 | 11/1981 | Ekelund | 206/825 |

Primary Examiner—Joseph Man-Fu Moy
Attorney, Agent, or Firm—Sandler & Greenblum

[57] ABSTRACT

A booster cable storage assembly includes a housing member, having two compartments, the first of which houses the booster cable and a reel member, the second housing a first booster clamp and a second booster clamp. The second compartment is separable for receiving two separate clamps. The cord is mounted, at its midpoint, through a slot in a shaft portion on the reel, such that when the cable is wound up on the reel member, each clamp can be positioned iin a respective section of the second compartment. A rotation handle is provided on the exterior of the housing such that manual rotation of the rotation member causes the cord member to become wound up on the shaft.

16 Claims, 2 Drawing Sheets

STORING BOX FOR BOOSTER CABLE

BACKGROUND OF THE DISCLOSURE

1. Technical Field of the Invention

This invention relates to a storage container for electrical booster cables and more particularly, to a new container and reel mechanism for storing an electrical booster cable which include electrical cords and end clamps, to maintain the end clamps in a clean condition, and to extend the useful life of the cable.

2. Discussion of Prior Art

Most common electrical booster cables have clamps which are designed to be installed on both ends of an electrical cord having a predetermined length. The booster cables are used for the inspection of an automobile battery or for connecting with the positive and negative terminals of the battery for recharging the battery or other relevant purposes.

Since electrical booster cables are commonly used for the transmission of high amperage, low voltage, DC currents, they are made from large diameter conductors, that is heavy gauge wire. The presence of clamps on the ends of the insulator conductor, in combination with the heavy electrical cords which are required, results in the electrical clamps and cords, i.e., the cables, not being easily stored by conventional winding devices.

Since the booster cables are not easily stored, the electrical clamps are easily spoiled by oil and accumulate dirt and mud, and, therefore the electrical conductivity of the cable, and its ability to make electrical contact, are adversely affected. Additionally, due to the susceptibility to damage, the life span of the booster cables is shortened.

SUMMARY OF THE INVENTION

In one aspect of the invention, a booster cable storage assembly is provided for storing a booster cable assembly having an electrically conductive cable with two ends and a clamp located at each of said ends, said storage assembly comprising a housing member, said housing member having a first compartment for receiving said cord, said first compartment having a first cable receiving opening, and a second cable receiving opening, a second compartment for receiving said clamps, and a reel assembly, said reel assembly having a first portion located within said first compartment and a second portion located to the exterior of said housing member, said cable being positioned on said reel assembly, whereby rotation of said reel assembly causes said cable to be selectively wound and unwound with respect to said reel assembly, said second compartment having openings for receiving said clamps.

The cable can be positioned on the reel assembly at a point proximate the midpoint of the cable, and the second compartment can be divided by a partition into first and second sections, one of the clamps being positioned in the first section of the second compartment and the other of the clamps being positioned in the second section of the second compartment. The housing member preferably includes a vertical partition, the first compartment being on one side of the vertical partition and the second compartment being positioned on a second side of the vertical partition. The housing member further includes an angled partition comprising means for separating the second compartment into first and second sections. The reel assembly includes a shaft member, the shaft member having a passage opening means for receiving the cable, the cable being positioned within said passage. The assembly can include a first disk member and a second disk member, the first disk member being retained on said shaft, within said first compartment, proximate a first wall of said first compartment, and said second disk member being retained on said shaft, within said first compartment, proximate a second wall of said first compartment, said two disks being parallel to each other, said shaft member passage being located between said first disk and said second disk. It can also comprise a rotatable member, the shaft having a first end which is located to the exterior of the housing member, the rotatable member being affixed to said shaft first end, whereby manual rotation of said rotatable member rotates said shaft and causes said cable to become wound up on said shaft.

In another aspect, a booster cable storage assembly is provided which comprises a housing, said housing having two opposed, substantially parallel end walls and four side walls extending between and connecting the end walls to form an interior compartment, a first divider wall between and substantially parallel to said end walls, said first divider wall dividing said interior compartment into two compartments, a first compartment for receiving a booster cable, said first compartment having a first cable receiving opening in one of said four side walls and a second cable receiving opening in a second of said four side walls, said first side wall and said second side wall being opposite and parallel to each other, and a second compartment, said second compartment having a partition wall therein, said partition wall forming a first cable clamp receiving section and a second cable clamp receiving section, said storage assembly being adapted to store a booster cable including an electrically conductive insulated cable, a first clamp and a second clamp at opposite ends of said cable, and a reel assembly, the reel assembly having a first portion located within said first compartment and a second portion located to the exterior of said housing member, said cable being positioned on said reel assembly, whereby rotation of said reel assembly causes said cable to be wound up on said reel assembly, said first clamp receiving section having a first opening in one of said side walls for receiving said first clamp and said second clamp receiving section having a second opening in a second side wall for receiving said second clamp. The first opening in one of said side walls has a lip region, whereby said lip region retains said first clamp within said first clamp receiving section, and said second opening in another of said side wall has a lip region, whereby said lip region of said other side wall retains said second clamp in said second clamp receiving section. The cable is positioned on the reel assembly at a point proximate the midpoint of the cable. The first clamp is positioned in the first clamp receiving section and the second clamp is positioned in said second clamp receiving section.

The reel assembly includes a shaft member, the shaft member having a passage for receiving the cable, said cable being positioned within said passage. The assembly further comprises a first disk member and a second disk member, said first disk member being retained on said shaft, within said first compartment, proximate a first wall of said first compartment, and said second disk member being retained on said shaft, within said first compartment, proximate a second wall of said first compartment, said first wall being parallel to said second wall, said shaft member passage being located between said first disk and said second disk; and a rotatable member, said shaft having a first end which is exterior to the housing member, said rotatable member being affixed to said shaft first end, whereby manual rotation of said rotatable member causes said cable to become wound up on said shaft.

In a third aspect of the present invention, a storage device for a booster cable is provided which comprises a housing having rear and front compartments, and a reel assembly with a turning handle, the reel assembly including a shaft passing through an intermediate portion of said two compartments and being freely rotatable in the housing, said cable being positioned on the reel assembly so as to have an S-shaped portion, said reel assembly including a slot which is adapted to receive said cable, said slot being located on the reel assembly portion which is in the front room compartment, said housing including opening holes which are adapted to receive said clamps, said rear compartment including two holes on opposite sides of said housing which are available to receive said two clamps.

BRIEF DESCRIPTION OF THE DRAWINGS

The above and other objects, features and advantages of the present invention can be achieved by the embodiment of the invention as described in detail hereinafter, in combination with the accompanying drawings, in which like reference numerals represent similar parts throughout, and wherein.

DESCRIPTION OF THE PREFERRED EMBODIMENTS

Figure 3:
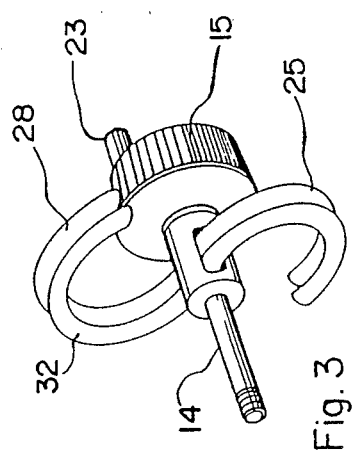
FIG. 3 is a fragmentary, perspective view of the cord, in an S-shape, on the shaft of a reel mechanism of the storage box.
Figure 2:
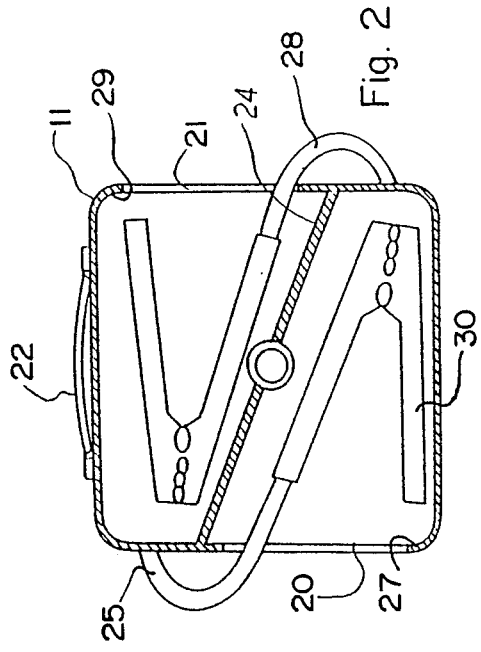
FIG. 2 is a cross-sectional view of the storage box of FIG. 1, showing the booster cable stored in the storage box.

The present invention relates a booster cable storage box which can easily store the electrical clamps and cords of the booster cable and enable them to be orderly wound into the box for facilitating storage, or to enable the cable to be extended out fast and easily during use, thus facilitating usage and enabling the cables to be kept clean and protected from being spoiled during storage. It is inventive and practical.

The storage box body is designed to be divided into two rooms or compartments which can respectively store the cord and electrical clamps and orderly in the storage box body; another, owing to the present invention having perfectly used all of the room in the box body, the volume of the storage box body is not too big and therefore is easily carried or placed in a location without occupying substantial space.

The booster cable storage assembly includes a box or housing 11 for an electrical booster cable. The housing body 11 is separated into a front room or compartment 12 and a rear room or compartment 13. A reel 15 is contained in the housing 11.

Reel 15 includes a shaft 14 on one end and a fixed bolt 16 on the other end. The shaft has a center slot 17, which is served as a guide for a booster cable or cord passing between the intermediate portion of cabinet body 11. The shaft 14 is situated on the front wall of the housing and is held in place by internally threaded bolt 16 which is located on the rear wall of housing 11. The bolt 16 is screwed and locked to the threaded end shaft 14.

Cord 32 is in the front room or compartment 12 of housing 11 and passes through the slot 17 in the center of shaft 14. A pair of disks 40 and 42 are fixed to the shaft 14, on either side of the opening 17, as for example, by means of a press fit. When rotating reel 15, the cord 31 coils in an S-shape about the shaft center and can be orderly stored in the housing 11.

The front compartment 12 of the housing 11 has openings 18 and 19 through which cord section 25 and cord section 28, respectively, extend outwards. Opening 20 and 21 in the rear compartment 13 enable the electrical clamps 26 and 30, respectively, to be placed into compartment 13. When the cord has been wound up on the reel and is stored in the housing, the electrical clamps 26 and 30 on the ends of the cord can be stored within rear compartment 13.

Figure 1:
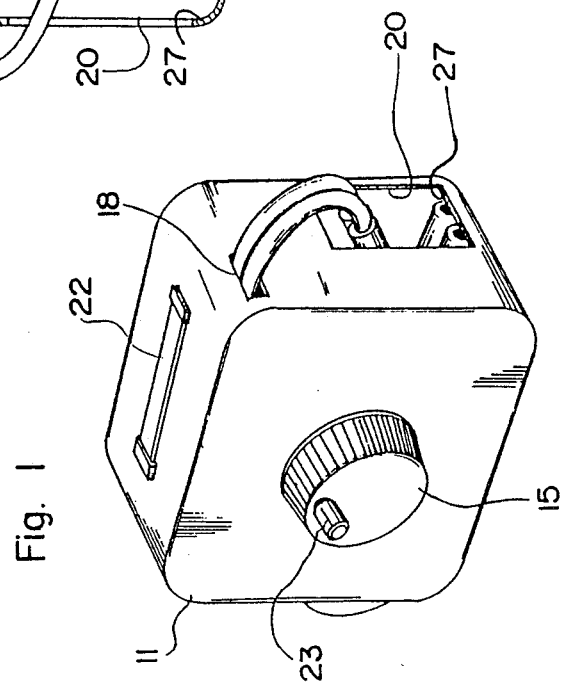
FIG. 1 is an embodiment of the storage box of the present invention showing the cord and electrical clamps stored in the storage box.
Figure 5:
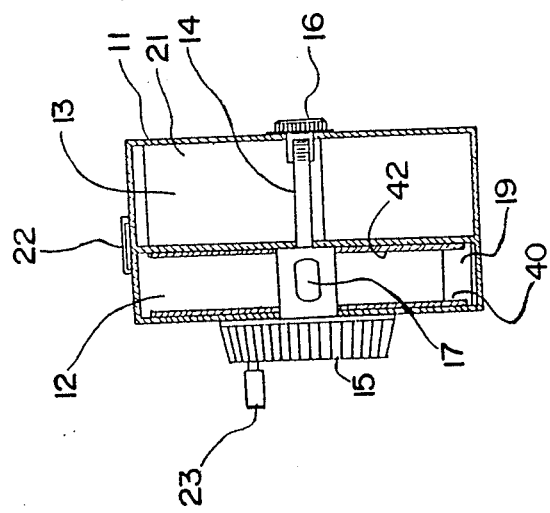
FIG. 5 is a cross-sectional view of the storage box body, showing three compartments.
Figure 4:
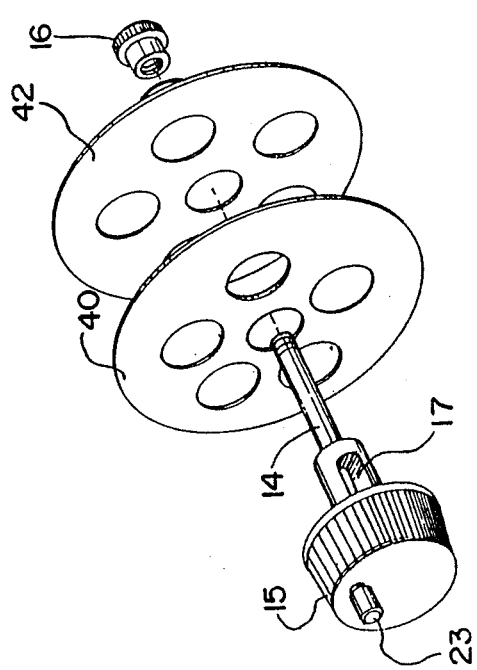
FIG. 4 is an exploded, perspective view of the reel mechanism of the storage box.

Cabinet body or housing 11 of the storing box also can be made into other shapes in addition to the shape shown in the embodiment of FIG. 1. For convenience, a handle 22 can be provided for carrying the booster cable storage assembly. Winding bar 23, is installed on outer side of reel 15. Partition 24 is provided in the rear compartment 13 of the housing in order to form two sections in the rear compartment and thereby separate electrical clamps 26 and 30 from each other. A lip region 27 helps to retain clamp 30 in its compartment and lip region 29 retains clamp 26 in its compartment.

To use the electrical booster cable, one need only withdraw clamps 26 and 30 from their respective sections of the rear compartment of the housing and simultaneously pull them apart. They can be conveniently pulled apart until the cord reaches the length required.

Thus, the booster cable storage assembly, including the housing and the electrical booster cable, provides a fast, efficient and safe way for storing booster cables and also relates to a mechanism for simultaneously placing a pair of electrical clamps into the housing, and thereby to achieve an effective storage position. In storage, the booster cable is contained orderly and clean and it is possible to avoid placing the cable on the ground, which would subject the cable to dirt and damage, thus extending the life span of the electrical booster cable. Again, as there is no identical or similar structure as compared to the storing box relating to the design of the present invention, it has achieved inventive, advanced and practical objects.

Of course, the present case is also intended to cover all modifications and embodiments of the present case which are within the scope of the claims and/or which would be considered to be obvious to those of ordinary skill in the art.

What is claimed is:

1. A booster cable storage assembly for storing a booster cable assembly having an electrically conductive cable with two ends and a clamp located at each of said ends, said storage assembly comprising a housing member, said housing member having a first compartment for receiving said cord, said first compartment having a first cable receiving opening and a second cable receiving opening, a second compartment for receiving said clamps, and a reel assembly, said reel assembly having a first portion located within said first compartment and a second portion located to the exterior of said housing member, said cable being positioned on said reel assembly, whereby rotation of said reel assembly causes said cable to be selectively wound and unwound with respect to said reel assembly, said second compartment having openings for receiving said clamps.

2. A booster cable storage assembly in accordance with claim 1, wherein said cable is positioned on said reel assembly at a point proximate the midpoint of said cable.

3. A booster cable assembly in accordance with claim 1, wherein said second compartment is divided by a partition into first and second sections, one of said clamps being positioned in said first section of said second compartment and the other of said clamps being positioned in said second section of said second compartment.

4. A booster cable assembly in accordance with claim 1, wherein said housing member includes a vertical partition, said first compartment being on one side of said vertical partition and said second compartment being positioned on a second side of said vertical partition.

5. A booster cable assembly in accordance with claim 4, wherein said housing member further includes an angled partition comprising means for separating said second compartment into first and second sections.

6. A booster cable assembly in accordance with claim 1, wherein said reel assembly includes a shaft member, said shaft member having a passage opening means for receiving said cable said cable being positioned within said passage.

7. A booster cable assembly in accordance with claim 6, further comprising a first disk member and a second disk member, said first disk member being retained on said shaft, within said first compartment, proximate a first wall of said first compartment, and said second disk member being retained on said shaft, within said first compartment, proximate a second wall of said first compartment, said two disks being parallel to each other, said shaft member passage being located between said first disk and second disk.

8. A booster cable assembly in accordance with claim 7, further comprising a rotatable member, said shaft having a first end which is exterior of said housing member, said rotatable member being affixed to said shaft first end, whereby manual rotation of said rotatable member rotates said shaft causes said cable to become wound up on said shaft.

9. A booster cable storage comprising a housing, said housing having two opposed, substantially parallel end walls and four side walls extending between and connecting said end walls to form an interior compartment, a first divider wall between and substantially parallel to said end walls, said first divider wall dividing said interior compartment into two compartments, a first compartment for receiving a booster cable, said first compartment having a first cable receiving opening in one of said four side walls and a second cable receiving opening in a second of said four side walls, said first side wall and said second side wall being opposite and parallel to each other, and a second compartment, said second compartment having a partition wall therein, said partition wall forming a first cable clamp receiving section and a second clamp receiving section, said storage assembly being adapted to store a booster cable including an electrically conductive insulated cable, a first clamp and a second clamp at opposite ends of said cable, a reel assembly, said reel assembly having a first portion located within said first compartment and a second portion to the exterior of said housing member, said cable being positioned on said reel assembly, whereby rotation of said reel assembly causes said cable to be wound up on said reel assembly, said first clamp receiving section having a first opening in one of said side walls for receiving said first clamp and said second clamp receiving section having a second opening in a second side wall for receiving said second clamp.

10. A booster cable assembly in accordance with claim 9, wherein said first opening in one of said side walls has a lip region, whereby said lip region retains said first clamp within said first clamp receiving section and said second opening in another of said side wall has a lip region, whereby said lip region of said another side wall retains said second clamp in said second clamp receiving section.

11. A booster cable storage assembly in accordance with claim 9, wherein said cable is positioned on said reel assembly at a point proximate the midpoint of said cable.

12. A booster cable assembly in accordance with claim 10, wherein said first clamp is positioned in said first clamp receiving section and said second clamp is positioned in said second clamp receiving section.

13. A booster cable assembly in accordance with claim 9, wherein said reel assembly includes a shaft member, said shaft member having a passage for receiving said cable, said cable being positioned within said passage.

14. A booster cable assembly in accordance with claim 13, further comprising a first disk member and a second disk member, said first disk member being retained on said shaft, within said first compartment, proximate a first wall of said first compartment, and said second disk member being retained on said shaft, within said first compartment, proximate a second wall of said first compartment, said first wall being parallel to said second wall, said shaft member passage being located between said first disk and said second disk.

15. A booster cable assembly in accordance with claim 13, further comprising a rotatable member, said shaft having a first end which is exterior to said housing member, said rotatable member being affixed to said shaft first end, whereby manual rotation of said rotatable member causes said cable to become wound up on said shaft.

16. A storage device for a booster cable, said device comprising a housing having rear and front compartments, a reel assembly with a turning handle, said reel assembly including a shaft passing through an intermediate portion of said two compartments and being freely rotatable in the housing, said cable being positioned on the reel assembly to have an S-shaped portion, said reel assembly including a slot which is adapted to receive said cable, said slot being located on the reel assembly portion which is in the front room compartment, said housing including opening holes which are adapted to receive said clamps, said rear compartment including two holes on opposite sides of said housing which are available to receive said two clamps.

* * * * *

UNITED STATES PATENT AND TRADEMARK OFFICE
CERTIFICATE OF CORRECTION

PATENT NO. : 4,942,964

DATED : July 24, 1990

INVENTOR(S) : Pi-Chen HSU

It is certified that error appears in the above-identified patent and that said Letters Patent is hereby corrected as shown below:

In the abstract, line 9, change "iin" to ---in---.

At column 4, line 15, change "31" to ---32---.

At column 4, lines 19 and 20, change "Opening 20 and 21" to ---Openings 21 and 20---.

At column 5, line 35, in claim 6, line 4, insert ---,--- after "cable" (first occurrence).

Signed and Sealed this

Twenty-first Day of July, 1992

Attest:

DOUGLAS B. COMER

*Attesting Officer*

*Acting Commissioner of Patents and Trademarks*